United States Patent Office 3,235,418  
Patented Feb. 15, 1966

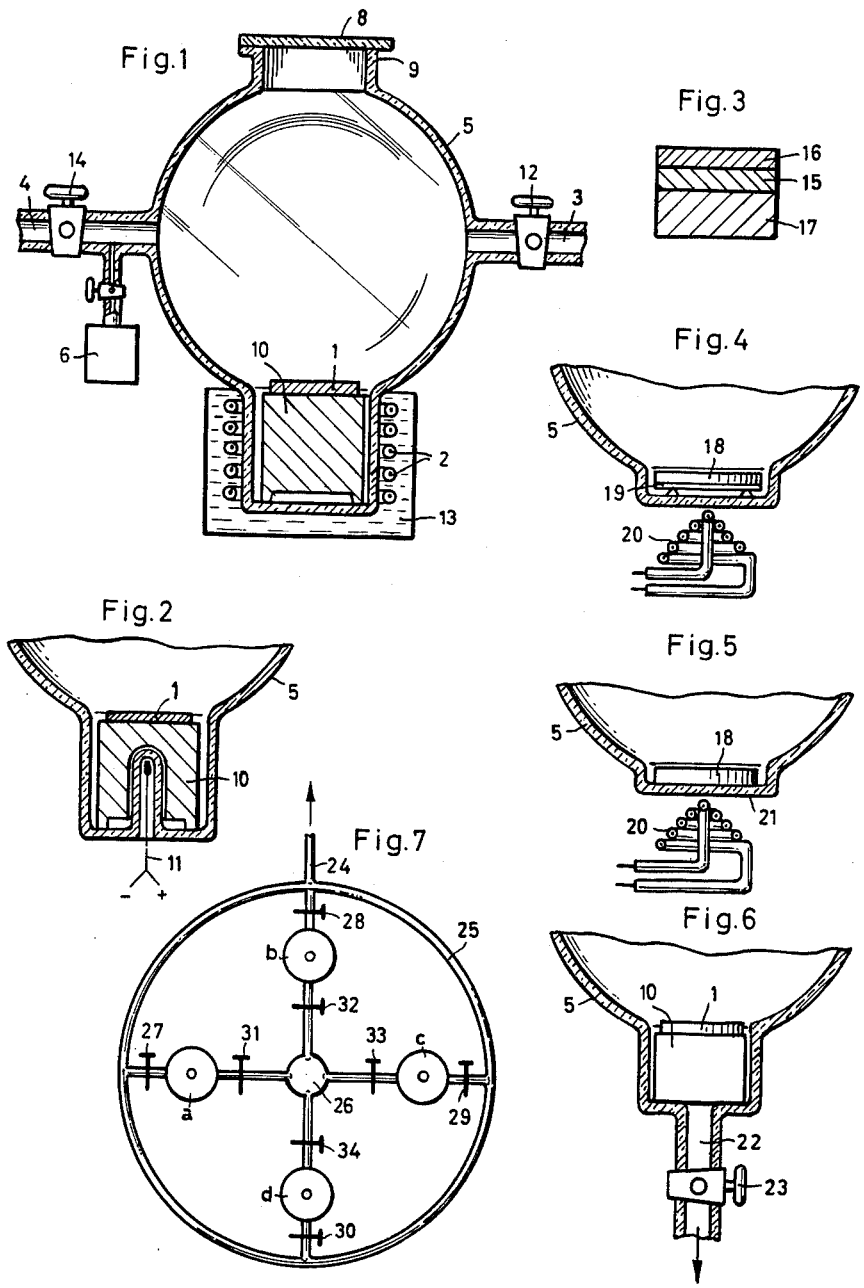

3,235,418  
METHOD FOR PRODUCING CRYSTALLINE LAYERS OF HIGH-BOILING SUBSTANCES FROM THE GASEOUS PHASE  
Julius Nickl, Neukeferloh, and Erhard Sirtl, Munich, Germany, assignors to Siemens & Halske Aktiengesellschaft, Berlin, Germany, a corporation of Germany  
Filed June 12, 1963, Ser. No. 287,429  
Claims priority, application Germany, June 14, 1962, S 79,912  
11 Claims. (Cl. 148—174)

Our invention relates to pyrolytic and similar methods for the production of crystalline, preferably monocrystalline, layers of high-boiling substances, particularly semiconductor materials such as germanium or silicon, by thermal dissociation of a gaseous compound and precipitation of the evolving substance upon a heated carrier.

Pyrolytic methods of this type for the production of monocrystalline thin layers of semiconductor material, thus growing such layers upon a carrier, preferably of the same material, by chemical reaction and precipitation from a gaseous compound have been performed in the following manner. For purifying the surface of the carrier prior to precipitation, the carrier is first annealed in high vacuum or in hydrogen or another protective gas atmosphere which is passed through the reaction vessel along the carrier. Thereafter, the carrier, consisting for example of a germanium wafer, is subjected to a flow of a gas mixture consisting of hydrogen and 0.1 to 1% by volume of germanium tetrachloride. For precipitating silicon upon a carrier of silicon, the operation is performed analogously, using silico-chloroform or silicon tetrachloride mixed with hydrogen. While the gas mixture passes through the reaction vessel, the carrier is maintained at the pyrolytic reaction temperature. The resulting chemical reaction results in the precipitation of solid substance, for example germanium or silicon, upon the carrier. For cooling the carrier, after growth of a precipitated layer of sufficient thickness, the reaction vessel has been rinsed with hydrogen.

Such dynamic modes of pyrolytic operation leave much to be desired. In the first place, the consumption of material is much greater than it is needed for the production of the layers grown on the carriers. This applies particularly to the hydrogen needed for rinsing during the cooling period and also needed in some cases while the carrier is being heated up to the reaction temperature. Excessive consumption is also involved with respect to the halogen compounds or generally for the gaseous compounds that furnish the material being precipitated. The excessively high consumption of compounds that furnish the precipitating material is mainly due to the fact that only a small proportion of the reaction gas flowing past the carrier is used for producing the precipitated layers proper.

Furthermore, when the reaction vessel is being rinsed with hydrogen, some amounts of contamination are inevitably dragged into the reaction space. Such contamination may also consist of solid substances. These, for example, may stem from the fact that when a hydrogen bottle was connected to the equipment, the connecting nipple inadvertently hits against a hard object. It can then immediately be observed that fine particles become co-precipitated and disturb the regular growth of the monocrystalline layer. When the carrier, at the beginning of the process, is heated up in a flow of hydrogen, the rinsing time usually amounts to a multiple of the time subsequently needed for precipitating the layers to be grown on the carriers.

Also detrimental are impurities and reaction products that precipitate on the inner wall surfaces of the reaction vessel and that may affect the operation and results during the next following layer-growing process performed in the same vessel.

It is an object of our invention to minimize or virtually eliminate the above-mentioned deficiencies and to devise a method and equipment operating with a greatly increased yield and affording the production of better products by reducing the danger of contamination.

According to our invention, a precipitation process, generally of the type mentioned in the foregoing, is performed as follows. After the carrier is heated in vacuum for purifying its surface and after it has thus been heated up to the desired reaction temperature, the reaction gas which contains the gaseous compound to be dissociated is rapidly admitted into the reaction vessel, that is, the vessel is filled with the reaction gas within an interval of short duration in comparison with the period of time during which the subsequent precipitation of material upon the carrier takes place. Then the reaction vessel is gas-tightly closed and remains sealed during the precipitation period, in which the carrier remains heated to the reaction temperature. That is, during the precipitating reaction no gas is supplied or passed out of the vessel. Upon termination of the layer-growing operation, the reaction gas is suddenly pumped out of the vessel so as to reestablish vacuum conditions during an interval of time which is short in comparison with the precipitation period; and the carrier, now provided with a grown crystalline layer of substance, is cooled in vacuum. During the above-described stages of the process, namely the heating-up of the carrier, the precipitation of material, and the cooling stage, the wall of the reaction vessel is maintained at a lower temperature than the carrier.

According to the invention, therefore, the operation is performed in a stationary system. That is, a flowing gas mixture subjected to constraint from without, namely the external pressure drop, is not employed. Used is rather a stationary quantity of gas mixture, and the carrier body to be provided with a grown crystalline layer is heated in vacuum prior to the reaction and precipitation, and is also permitted to cool down in vacuum upon termination of the precipitation. During the cooling stage, the negative pressure substitutes for the scavenging or rinsing gas used in the known methods. The heating of the carrier in vacuum up to the reaction temperature is generally performed by first heating the carrier to a temperature above the desired reaction temperature for the purpose of purifying its surface, and thereafter changing the carrier temperature by adjusting it to the reaction temperature proper.

By thus operating with a stationary system and consequently under equilibrium conditions, the thickness of the precipitating layer can be adjusted in a defined and predetermined manner by correspondingly selecting the share of the gaseous compound contained in the reaction-gas mixture and furnishing the layer substance. The method therefore is particularly well suitable for the production of very thin layers. As mentioned, the introduction of the reaction gas after the carrier is heated up to the reaction temperature in vacuum takes place within a very short interval in comparison with the duration of the subsequent precipitation, and the removal of the residual gases also takes place within such a very short time. Furthermore, the flow of gas into the vessel and out of the vessel during the precipitation stage proper is eliminated. For these reasons, stable and predetermined conditions are secured during the entire precipitating operation and are controllable or adjustable in any desired manner. Since the vessel walls during the heating-up stage, precipitation, and cooling stage are cooled, any impurities, as may for example evaporate out of metal parts of the apparatus or reaction products evolving during precipitation of the crystalline layer, condense at the vessel walls. While the carrier is being heated up and during cooling of the coated carrier in vacuum following the precipitation stage, such impurities then evaporate and are subsequently sluiced out of the vessel.

It has been found particularly favorable if the admitting interval for the reaction gas upon heating-up of the carrier amounts to approximately one-tenth of the precipiation period. The interval during which the gas mixture is being exhausted by pumping after completion of the layer-growing precipitation, is preferably one-tenth down to one-hundredth of the precipitation period. According to a preferred form of the method, the heating-up and the cooling of the carrier are both performed at a vacuum of less than $10^{-2}$ mm. Hg.

The temperature at which the walls of the reaction vessel are being kept during the entire process is preferably +10 to —300° C.

During the reaction and precipitation period, a pressure of the reaction gas of 0.1 to 5 atmospheres has been found particularly favorable.

A comparison of the known dynamic method with the stationary method according to the invention resulted in the following data.

A silicon disc of 2 cm. diameter is coated with a monocrystalline layer of silicon pyrolytically precipitated from a reaction gas composed of 4 vol. percent silicon tetrachloride and 96 vol. percent hydrogen. The dynamic method requires for heating-up of the carrier and for rinsing of the reaction vessel a quantity of 50 liter hydrogen. During the cooling interval after termination of the precipitation process an additional quantity of 30 liter hydrogen is consumed. Even if the carrier is heated up in vacuum, the consumption of hydrogen during cooling remains very high. In contrast thereto the static-system method according to the invention does not involve a consumption of rinsing gas because the carrier is heated up as well as cooled in vacuum. For precipitating a silicon layer of 12 micron thickness, the silicon tetrachloride consumption in the method according to the invention is reduced to $4 \cdot 10^{-3}$ mole in comparison with $2 \cdot 10^{-2}$ mole in the known dynamic process. Such economy is of outstanding importance particularly on account of the required extreme purity of the starting gases needed for semiconductor manufacturing purposes. It has also been found that the disturbance in the growth of the resulting crystalline silicon layer is reduced by the factor 7 per square centimeter when employing the stationary-system process according to the invention, as compared with the dynamic method.

The method according to the invention has the further advantage of an extremely rapid performance because, after a given amount of gas mixture is pumped out of the processing vessel, the next operation can immediately be started with a gas mixture of different composition and/or different dopant concentration. Already at the beginning precipitation, even in the case when the gaseous atmosphere has been changed, there obtain definitely defined operating conditions, for example a given dopant concentration. This is of value particularly in semiconductor techniques for the production of p-n junctions. For this purpose, gaseous or vaporous doping substances are added to the gas mixture, preferably in a dopant concentration from 0.1 to $10^{-10}$ vol. percent.

The invention also affords precipitating layers of respectively different substances upon each other. For this purpose, the method is performed as described in the foregoing, but after the reaction gas is exhausted from the reaction vessel, a reaction gas which contains a gaseous compound of a different substance having a lower melting point than the one first precipitated, is admitted into the reaction vesel. In this maner a germanium layer can be precipitated upon a silicon layer, for example.

The carrier employed for receiving the precipitation may also have a crystalline lattice structure different from that of the substance being precipitated. Thus, for example, silicon, boron, germanium, silicon carbide, titanium carbide or quartz glass can be coated with a layer of pyro-graphite in an atmosphere of $CH_4$ and hydrogen. This method can also be used for coating a graphite carrier with a pyro-graphite layer.

During the precipitation period in the method according to the invention, the temperature of the carrier is preferably kept constant at the proper reaction value. However, if different respective gas mixtures are to act upon one and the same carrier to be coated with respectively different substances in one and the same apparatus, then the carrier temperature can be chosen differently for the respectively different preciptation periods.

The invention is particularly well suitable for the production of two- and three-zone members of semiconductor material, for example germanium or silicon, such as employed in the production of diodes, transistors, photoelectric cells and other electronics semiconductor devices. Therefore, reference to such electronic uses of the products made according to the invention will be made, by way of example, in the following in conjunction with the accompanying drawing on which there are illustrated different embodiments of apparatus for performing the method described above.

FIG. 1 shows schematically and in section a complete processing apparatus;

FIG. 2 shows in section the lower portion of the same apparatus in modified form;

FIG. 3 shows schematically and in section a three-layer semiconductor member as produced in the apparatus.

FIGS. 4, 5 and 6 illustrate respectively three different modifications of part of an apparatus otherwise similar to the one shown in FIG. 1; and FIG. 7 is a schematic plan view of a processing plant comprising four apparatus according to any of the preceding illustrations, connected to common gas supply and discharge lines.

Shown in FIG. 1 is a processing vessel 5 of quartz or quartz glass which is provided with a gas tube or nipple 3 for connection to a vacuum pump and a gas inlet tube or nipple 4. The top portion of the vessel forms a flanged collar 9 covered by a removable glass pane 8. When the cover plate 8 is removed, the interior of the vessel is accessible for the insertion or removal of carrier bodies of which one is shown at 1 supported on a heatable base 10. When the glass plate 8 is in the illustrated closed and sealed position, it permits observing the interior.

In the example described presently, the quartz vessel 5 has a content of approximately 980 ml. Placed upon the support 10 is a circular disc of silicon doped with phosphorus to a donor concentration of $10^{15}$ atoms phosphorus per $cm.^3$. The diameter of the silicon disc is 15 mm. and its thickness about 300 microns. The disc is first lapped and polished and then placed upon the support 10, which consists of silicon and has a cylindrical shape of about 20 mm. diameter and 25 mm. height. After closing the vessel and evacuating it through nipple 3, the appertaining cock 12 being then open and the corresponding cock 14 and nipple 4 being closed, to a vacuum pressure of 2 to $6 \cdot 10^{-4}$ mm. Hg, the support 10 is heated to about 1180° C. for 7 minutes. This is done by means of an inductance heater coil 2 which surrounds the lower portion of the processing vessel containing the support 10, and which during operation is supplied with alternating current of 2 to 3 megacycles per second. During the just mentioned heating interval of 7 minutes, the vacuum pressure is maintained by continuous pumping through nipple 3. At the end of the 7-minute period, the carrier 1 is heated at a somewhat lower temperature so that it assumes the precipitation temperature of 1150° C. for silicon. Now a gas mixture of 3 vol. percent $SiCl_4$ and 97 vol. percent hydrogen is uniformly admitted through nipple 4 into the vessel 5, the cock 14 being now open and the cock 12 closed. The admitting interval is 12 seconds. The mixture is produced by passing hydrogen over or through liquid silicon tetrachloride in the conventional manner. The liquid $SiCl_4$ contains approximately 0.1 vol. percent arsenic trichloride. Consequently, the gaseous mixture entering during the 12-second interval into the processing vessel also contains arsenic as a dopant. During the just mentioned 12-second interval, with cock 12 closed, the total pressure in the processing vessel increases gradually and uniformly up to 810 mm. Hg. The increase in pressure is preferably supervised by pressure measurement effected at 6 with conventional measuring equipment, for example a mercury manometer, or by measuring the heat conductance of the gases as indicative of pressure.

The temperature is measured pyrometrically through the inspection glass cover 8. The pyrometer can be calibrated, for example, by mounting a thermocouple 11 in a bore or cavity of the silicon block 10 as is shown for the thermocouple 11 in FIG. 2.

The precipitation and epitaxial growth of a monocrystalline silicon layer on the carrier 1 take place within 5 minutes during which the temperature of the carrier 1 is maintained at 1155±10° C. Then the cock 12 is opened and the gas mixture is exhausted within 3 seconds down to a vacuum pressure of $10^{-3}$ mm. Hg. The operation of the vacuum pump is then continued for 7 additional minutes before the cock 12 is closed. Then the same gas mixture as mentioned above, however with an arsensic trichloride concentration of 0.01 vol. percent in the liquid silicon tetrachloride, is introduced through the nipple 4. Then the precipitation stage is repeated as described above and at the same negative pressure of 810 mm. Hg. Thereafter the gas mixture is again exhausted by pumping within 3 seconds down to about $10^{-3}$ mm. Hg, and the high-frequency heating coil 2 is deenergized. Now the cooling water 13 in the tank surrounding the lower portion of the processing vessel takes care of rapidly cooling the support 10 and the carrier 1. The cooling stage is terminated in about 7 minutes. When using a supporting body 10 of silicon which has a hollow or cavity extending from its bottom side as exemplified in FIG. 2, a cooling down to 50–80° C. can be attained within 4 to 5 minutes. Such a pot-shaped supporting body can be made hollow to such an extent that its wall thickness is only 3 to 4 mm. Heating supports of such a small wall thickness cool very rapidly. Prior to opening the reaction vessel 5 by removing the glass cover 8, the interior is vented through nipple 4 and cock 14 by supplying pure hydrogen or nitrogen.

A product as resulting from the above-described processing example is schematically illustrated in FIG. 3, the thickness of the layers shown being exaggerated for the purpose of illustration. The original carrier or substrate 17 is provided with two monocrystalline layers of silicon. The dopant concentration of the first precipitated layer 15 of 10±0.7 micron thickness is $2 \cdot 10^{19}$ atoms of arsenic per cm.$^3$ silicon. The dopant concentration of the second epitaxial layer 16, likewise having a thickness of 10±0.7 micron, is $10^{16}$ atoms of arsenic per cm.$^3$ silicon.

Another essential advantage of the method according to the invention is the resulting extreme sharpness of the boundary between the doping of the two epitaxial layers. The originally more strongly doped gas mixture, too, does not drag any doping substances into the second epitaxial layer.

This advantage is particularly significant if the gas mixtures used contain opposingly acting doping substances. This is the case, for example, when processing a germanium substrate in the apparatus shown in FIG. 1 by the method analogous to the one described above with reference to silicon, except that the lower epitaxial layer is doped with boron and the upper layer with phosphorus. For doping the first-deposited layer with boron, boron trichloride is dissolved in germanium tetrachloride and the gas, laden with the doping substance, is mixed with hydrogen as carrier gas. After preheating the germanium substrate at about 125° C. in vacuum and thereafter adjusting the reaction temperature of 820° C., the dopant-containing gas mixture is admitted into the reaction vessel during an interval of 12 seconds. The mole ratio of germanium tetrachloride to hydrogen is 0.04. The first epitaxial layer thus grown on the substrate has p-type conductance. For thereafter precipitating the second layer, phosphorus trichloride is added to the germanium tetrachloride and the process is otherwise repeated in the manner described above. After then precipitating the second epitaxial layer, the support and the carrier resting thereupon are cooled likewise as described above. The p–n junction thus produced has a width of about 0.1 micron.

The total time needed for epitaxial precipitation can be shortened by heating the substrate directly by infrared radiation or inductively. In this case a heat-transmitting body or support is not necessary. A correspondingly modified apparatus is illustrated in FIG. 4. A disc-shaped substrate 18, resting upon an inert layer 19, is heated from the outside by means of an induction coil 20 of conical shape.

If the bottom of the processing vessel 5 on the inner side of the reaction chamber is given a fully planar shape as shown at 21 in FIG. 5, the disc-shaped carrier or substrate 18 may also be placed directly upon the vessel bottom. This also affords the production of monocrystalline layers for example of boron, germanium or silicon.

If the reaction results in by-products that are less volatile than the starting substances, it is preferable to have the exhaust duct or line 22 located in the vicinity of the supporting structure as is shown in FIG. 6. The duct or nipple 22 than takes the place of the one denoted by 3 in FIG. 1. A cock 23 is provided for opening and closing the line 22.

When performing the method according to the invention, the thickness of the layers to be grown on the substrate can be adjusted or varied by such simple expedients as described presently. In the first place, the layer thickness can be controlled by correspondingly selecting the volume of the processing vessel 5. Furthermore, the total pressure of the reaction gas can be adjusted to the desired value during the precipitation period. It has been found that the crystal disturbances in the grown layer are reduced with a reduction in gas pressure and that they virtually vanish in the pressure range of 100 to 500 mm. Hg. A change in layer thickness can also be effected with the aid of the known expedients, namely by selecting or adjusting the gas concentration and the duration of the precipitation period.

The method according to the invention is particularly well suitable for growing crystalline, especially monocrystalline, epitaxial layers, on substrates consisting of high-boiling (difficult to volatilize) elements such as boron, silicon, germanium, graphite and hard substances such as silicon carbide and other carbides, the epitaxially precipitated layer consisting preferably of the same elemental substance as the substrate. However, high-boiling (difficult to volatilize) metals such as tungsten and molybdenum can also be provided with crystalline, preferably monocrystalline, layers. Low-boiling (readily vaporizing) substances, however, can be epitaxially grown only with difficulty when employing this mode of operation because the material vaporizes off when the substrate is being heated up during the first phase of the process.

Compounds, for example gallium arsenide, indium arsenide and aluminum arsenide, can also be provided by the method according to the invention with monocrystalline epitaxial layers of the same or of a different substance having a similar crystalline lattice structure. Consequently, the method is applicable for the production of the so-called $A^{III}B^V$ compounds employed as electronic semiconductors. In such cases, the reaction gases employed are preferably halogen compounds of the corresponding substances in mixture with hydrogen or all of those gas mixtures that furnish a solid substance as reaction product at increased temperature.

In the production of epitaxial layers consisting of compounds, the following selection of substances for the gas mixture has been found to be favorable for obtaining epitaxial layers of uniform thickness and satisfactory crystalline structure.

Employed, for example, is a gas mixture composed of a volatile compound of the element A and a volatile compound of the element B. Both compounds are diluted with hydrogen to which neutral gases or crystallization promoting substances may be added. Such compounds are mainly halides, for example HCl, $SiCl_4$ or bromide or iodide. The reaction with such mixtures takes place in accordance with the following equation.

$$AX_{3(g)} + BX_{3(g)} + 3H_{2(g)} \rightarrow AB_{(s)} + 6HX_{(g)}$$

The parenthetical subscripts in the equation have the following meaning: $g$=gaseous, $s$=solid.

For example, in order to produce a layer of gallium phosphide on a substrate consisting of gallium phosphide or gallium arsenide, $GaCl_3$ and $PCl_3$ are mixed with hydrogen and passed into the reaction vessel in the performance of the method according to the invention as described above. As a result, a monocrystalline layer of gallium phosphide is precipitated on the substrate, in accordance with the reaction $$GaCl_3 + PCl_3 + 3H_2 \rightarrow GaP + 6HCl_{(g)}$$

According to another mode of performing the method, compounds may also be used in which the compound to be precipitated is already pre-formed; that is, the compound used as one of the starting substances already contains the components of the compounds to be precipitated in the correct atomic ratio. Such a gaseous compound, in the performance of the process according to the invention, then becomes dissociated in accordance with the reaction $$YA\text{—}BX_{n(g)} + \text{diluting gas} = AB_{(s)} + \text{dissociation products } (g)$$

For example, a layer of silicon carbide can be produced on a heated substrate of silicon carbide by using $$Cl_3Si\text{—}CH_3$$

in the above-described method. The compound becomes thermally dissociated in accordance with the equation $$Cl_3Si\text{—}CH_3 + H_2 = SiC_{(s)} + \text{dissociation products } (g)$$

Analogously, titanium carbide can thus be precipitated from $Cl_3Ti\text{—}CH_3$ in accordance with the equation $$Cl_3Ti\text{—}CH_3 + H_2 = TiC_{(s)} + \text{dissociation products } (g)$$

It is a characteristic feature of the method according to the invention that it affords drawing monocrystalline layers of 0.001 to 100 micron thickness by means of a single precipitating operation with a very accurately defined thickness value. The thickness depends mainly upon the vessel volume and hence upon the available amount of the gas which furnishes the layer substance. A volume of more than 10 liter constitutes virtually the upper limit when only one substrate is being processed. The lower limit is at approximately 50 ml. The upper limit is reached when during epitaxial precipitation a stationary condition is no longer attainable. The lower limit is determined by the desired quantity of substance. Generally, the size of the substrate surface to be coated, and the thickness of the layer to be precipitated are determining for the most favorable vessel volume to be chosen. By selection of the gas pressure and the precipitation period a further variation in layer thickness is available.

An advantage of the method also resides in the possibility of performing a continuous operation as exemplified by FIG. 7. The illustrated equipment comprises four processing vessels, $a$, $b$, $c$, $d$, each corresponding for example to FIG. 1 or to any of the other embodiments described above. The four vessels are all connected to a suction line 24 by means of a ring line 25. The four vessels are further connected by radial gas lines with a common gas supply conduit 26. Valves or cocks denoted by 27 to 30 permit individually connecting and separating the four vessels with the suction line 24, and corresponding valves or cocks 31, 32, 33 and 34 permit individually connecting and disconnecting the reaction vessels with respect to the common supply conduit 26.

The continuous operation may be performed for example as follows. While epitaxial layers are being grown on respective substrates in the vessels $a$ and $c$, new substrates are being prepared for subsequent precipitation by being heated up in vessels $b$ and $d$. While thereafter the vessels $a$ and $c$ are subjected to cooling upon completion of the precipitation stage, the substrates in vessels $b$ and $d$ are being coated by precipitating substance. While four vessels are shown in FIG. 7, the number of reaction vessels preferably arranged about a central supply conduit 26 and connectable therewith, depends upon the periods of time required for the individual processing stages. For example, six, eight, twelve and more processing vessels can thus be combined to a single unit in order to afford continuous operation.

While in the foregoing reference is made to epitaxial precipitation of layers upon a single substrate within each reaction vessel, it will be understood that by employing a sufficiently large heat-transmitting support, a plurality of carriers or substrates can readily be processed simultaneously in the same vessel without any other change in the method described above.

Another modification is to mount several heat-transmitting supports in one and the same reaction vessel, each support carrying one or more carriers or substrates to be heated by the supports up to the reaction temperature and to be maintained at that temperature during the precipitation stage. Analogously, the vessel construction can be modified to directly accommodate a plurality of carriers or substrates to be directly heated, for example in the manner explained above with reference to FIGS. 4 and 5 with the aid of inductive heating means, or by heating the substrates with the aid of electric current directly passing therethrough.

Such and other modifications will be obvious to those skilled in the art, upon a study of this disclosure, and are indicative of the fact that our invention can be given embodiments other than particularly illustrated and described herein, without departing from the essential features of our invention and within the scope of the claims annexed hereto.

We claim:

1. The method of producing crystalline layers of high-boiling substances by thermal dissociation of a gaseous compound and precipitation of the evolving substance upon a heated substrate, which comprises heating the carrier in an evacuated reaction vessel up to the reaction temperature; then rapidly admitting into the reaction vessel the reaction gas containing the gaseous compound to be dissociated, during an interval of about $\frac{1}{10}$ to $\frac{1}{100}$ of the following precipitation period, the substrate remaining heated to said reaction temperature during gas admittance and precipitation; hermetically sealing the vessel and maintaining it sealed during the precipitation period; applying a vacuum to the reaction vessel to exhaust the residual reaction gas upon termination of the precipitation period and to re-establish vacuum in the vessel during an interval of about $\frac{1}{10}$ to $\frac{1}{100}$ of the preceding precipitation period; cooling the substrate in vacuum; and maintaining the walls of the reaction vessel during heating-up, precipitation, and cooling at a temperature lower than that of the substrate until the substrate is cooled.

2. The method of producing monocrystalline layers of semiconductor substance, which comprises heating a substrate of crystallographically compatible monocrystalline material in an evacuated reaction vessel to pyrolytic reaction temperature; then filling the vessels with a reaction gas containing a gaseous compound of the semiconductor substance, the filling interval being about $\frac{1}{10}$ to $\frac{1}{100}$ of the following precipitation period, closing the vessel and maintaining it closed during the precipitation period whereby a layer of the semiconductor substance is precipitated in monocrystalline form on the substrate in a layer thickness dependent substantially upon the enclosed quantity of gas; exhausting the residual reaction gas upon termination of the precipitation period to re-establish vacuum in the vessel during an interval of time about $\frac{1}{10}$ to $\frac{1}{100}$ of the preceding precipitation period, and cooling the substrate in vacuum; and maintaining the walls of the reaction vessel during heating-up, precipitation, and cooling at a temperature lower than that of the substrate.

3. The method of producing crystalline layers of high-boiling substances by thermal dissociation of a gaseous compound and precipitation of the evolving substance upon a heated substrate, which comprises heating the substrate in an evacuated reaction vessel up to the reaction temperature; then rapidly admitting into the reaction vessel a reaction-gas mixture containing a carrier gas and a gaseous compound of the substance to be precipitated and thereby filling the vessel during an interval of $\frac{1}{10}$ to $\frac{1}{100}$ of the following precipitation period, the substrate remaining heated to said reaction temperature during gas admittance and precipitation; closing the vessel gas-tight and maintaining it closed during the precipitation period; suddenly exhausting the residual reaction gas upon termination of the precipitation period to re-establish vacuum in the vessel during a short interval of time of about $\frac{1}{10}$ to $\frac{1}{100}$ of the preceding precipitation period; then repeating the admission of reaction gas and precipitation period as set forth above but with a reaction gas of a composition different from that first admitted; then evacuating the vessel in an interval of time of about $\frac{1}{10}$ to $\frac{1}{100}$ of the precipitation periods and cooling the carrier in vacuum; and maintaining during the entire process the walls of the reaction vessel at a temperature lower than that of the carrier until the carrier is cooled.

4. The method of producing monocrystalline layers of semiconductor substance, which comprises heating a monocrystalline substrate in an evacuated reaction vessel to pyrolytic reaction temperature; then rapidly filling the vessel with a reaction-gas mixture containing a carrier gas and a dopant and a gaseous compound of the semiconductor substance, the filling interval being about $\frac{1}{10}$ to $\frac{1}{100}$ of the following precipitation period, closing the vessel and maintaining it closed during the precipitation period whereby a doped layer of the semiconductor substance is precipitated in monocrystalline form on the subtsrate, applying a vacuum to exhaust the residual reaction gas upon termination of the precipitation period to re-establish vacuum in the vessel during a period of about $\frac{1}{10}$ to $\frac{1}{100}$ of the preceding precipitation period, and cooling the substrate in vacuum; and maintaining the walls of the reaction vessel during heating-up, precipitation, and cooling at a temperature lower than that of the substrate.

5. The method of producing monocrystalline layers of semiconductor substance, which comprises heating a substrate of semiconductor material in an evacuated reaction vessel to pyrolytic reaction temperature; then filling the vessel with a reaction-gas mixture containing a carrier gas and a gaseous compound of the semiconductor substance to be precipitated and an addition of dopant in a concentration of $10^{-1}$ to $10^{-10}$ vol. percent, the filling interval being about $\frac{1}{10}$ to $\frac{1}{100}$ of the following precipitation period, closing the vessel and maintaining it closed during the precipitation period whereby a doped layer of the semiconductor substance is precipitated in monocrystalline form on the substrate, applying a vacuum to exhaust the residual reaction gas upon termination of the precipitation period and to re-establish vaccum in the vessel during an interval of time about $\frac{1}{10}$ to $\frac{1}{100}$ of the preceding precipitation period, and cooling the substrate in vacuum; and maintaining the walls of the reaction vessel during heating-up, precipitation, and cooling at a temperature lower than that of the substrate.

6. The method of producing crystalline layers by thermal dissociation according to claim 1, which comprimises maintaining the reaction gas during the precipitation period at a pressure of 0.1 to 5 atmospheres.

7. The method of producing crystalline layers by thermal dissociation according to claim 1, which comprises maintaining during heating-up and during cooling of the carrier a vacuum pressure below $10^{-2}$ mm. Hg.

8. The method of producing crystalline layers by thermal dissociation according to claim 1, which comprises using as substrate a monocrystalline body of the same substance as the one being precipitated.

9. The method of producing crystalline layers by thermal dissociation according to claim 1, which comprises maintaining the vessel walls at a temperature of $-10$ to $+300°$ C.

10. The method of producing crystalline layers by thermal dissociation according to claim 1, which comprises placing the substrate on top of a heatable support in face-to-face contact therewith, and heating the substrate to the reaction temperature by heat transfer from the support.

11. The method of producing crystalline layers by thermal dissociation according to claim 1, which comprises heating the substrate directly from the outside of the reaction vessel.

References Cited by the Examiner

UNITED STATES PATENTS

| | | | |
|---|---|---|---|
| 2,692,839 | 10/1954 | Christensen et al. | 148—175 |
| 2,763,581 | 9/1956 | Freedman | 148—175 |
| 2,815,462 | 12/1957 | Auphan | 148—175 |
| 2,840,494 | 6/1958 | Parker | 148—175 |
| 2,979,386 | 4/1961 | Shockley et al. | 23—273 |
| 3,014,791 | 12/1961 | Benzing et al. | 23—273 |
| 3,085,913 | 4/1963 | Caswell | 148—175 |
| 3,113,889 | 12/1963 | Cooper et al. | |
| 3,152,022 | 10/1964 | Christensen et al. | 148—175 |

FOREIGN PATENTS 1,029,941    5/1958    Germany.

OTHER REFERENCES

Holland: Vacuum Deposition of Thin Films, Chapman & Hall, fifth printing, January 1963 (first printing in 1956), pp. 25–27.

DAVID L. RECK, *Primary Examiner.*